(12) United States Patent
Erlandson

(10) Patent No.: US 8,528,514 B1
(45) Date of Patent: Sep. 10, 2013

(54) PISTON FOR RECIPROCATING ENGINES

(75) Inventor: Richard K. Erlandson, Lewistown, MT (US)

(73) Assignee: New Age Technology LLC, Sheridan, WY (US)

( * ) Notice: Subject to any disclaimer, the term of this patent is extended or adjusted under 35 U.S.C. 154(b) by 0 days.

(21) Appl. No.: 13/569,135

(22) Filed: Aug. 7, 2012

(51) Int. Cl.
*F02F 3/00* (2006.01)

(52) U.S. Cl.
USPC .................. 123/193.6; 123/193.4; 29/888.04

(58) Field of Classification Search
USPC .................. 123/307, 193.6, 671, 661, 193.4; 29/888.04–888.049
See application file for complete search history.

(56) References Cited

U.S. PATENT DOCUMENTS

| | | | | |
|---|---|---|---|---|
| 1,745,884 | A | * | 2/1930 | Barnaby ........................ 123/307 |
| 2,231,392 | A | * | 2/1941 | McCarthy ...................... 123/307 |
| 3,209,735 | A | * | 10/1965 | Clarke ........................... 123/276 |
| 3,924,580 | A | * | 12/1975 | Taira et al. ..................... 123/307 |
| 3,965,872 | A | * | 6/1976 | Taira et al. ..................... 123/269 |
| 4,063,537 | A | | 12/1977 | Lampredi |
| 4,280,459 | A | | 7/1981 | Nakanishi et al. |
| 4,471,734 | A | | 9/1984 | Showalter |
| 4,572,123 | A | | 2/1986 | Evans |
| 4,669,431 | A | | 6/1987 | Simay |
| 5,000,136 | A | | 3/1991 | Hansen et al. |
| 5,065,715 | A | | 11/1991 | Evans |
| 5,103,784 | A | | 4/1992 | Evans |
| 5,215,052 | A | * | 6/1993 | Augustin ....................... 123/276 |
| 6,047,592 | A | | 4/2000 | Wirth et al. |
| 6,170,454 | B1 | | 1/2001 | McFarland et al. |
| 6,237,579 | B1 | | 5/2001 | Singh |
| 6,729,290 | B1 | * | 5/2004 | Rorke .......................... 123/193.6 |
| 7,581,526 | B2 | | 9/2009 | Lehmann |
| 7,721,704 | B2 | | 5/2010 | Lehmann |
| 7,810,479 | B2 | | 10/2010 | Naquin |
| 8,051,830 | B2 | | 11/2011 | Taylor |
| 2007/0044755 | A1 | | 3/2007 | Lehmann |
| 2009/0038594 | A1 | | 2/2009 | Naquin |
| 2009/0223481 | A1 | | 9/2009 | Lehmann |
| 2011/0030654 | A1 | | 2/2011 | Taylor |

FOREIGN PATENT DOCUMENTS

| | | | | |
|---|---|---|---|---|
| JP | 52006809 | A | * | 1/1977 |
| WO | WO9110825 | | * | 7/1991 |

* cited by examiner

*Primary Examiner* — Hung Q Nguyen
(74) *Attorney, Agent, or Firm* — Antoinette M. Tease

(57) ABSTRACT

A modified piston for a reciprocating engine, the piston having a piston face that comprises a plurality of radially-oriented grooves. Each groove comprises a distal end proximate a periphery of the piston face and a proximal end proximate a center of the piston face. The width of the distal end of each groove is greater than the width of the proximal end of the groove. The depth of the distal end of each groove is greater than the depth of the proximal end of the groove. The proximal end of each groove terminates in a point.

11 Claims, 11 Drawing Sheets

PISTON FOR RECIPROCATING ENGINES

BACKGROUND OF THE INVENTION

1. Field of the Invention

The present invention relates generally to the field of reciprocating engines, and more specifically, to an improved piston with radially-oriented and tapered grooves on the piston head.

2. Description of the Related Art

Most automobile engines are internal combustion engines in which the fuel burns in a plurality of combustion chambers inside of an engine block. Directly beneath each combustion chamber is a cylinder, and most engines have four, six or eight cylinders. A piston moves up and down (reciprocates) inside of each cylinder, and the piston face (or top surface) forms the floor of the combustion chamber. In a typical engine, the number of cylinders equals the number of pistons.

When the air-fuel mixture inside of the combustion chamber ignites, the explosive force pushes the piston downward. Each piston is connected to a crankshaft by a connecting rod. The pistons are configured on the crankshaft such that the downward force of one or more pistons causes one or more other pistons to move upward, thereby compressing the air-fuel mixture inside of the combustion chamber. Each combustion chamber has a port for an intake valve, an exhaust valve, and a spark plug. In a properly functioning engine, the spark plug delivers a spark to the combustion chamber when the piston is nearly at its upward-most position within the combustion chamber during the compression stroke.

A typical engine comprises four "strokes," which refer to the up-and-down motion of the piston: intake, compression, power and exhaust. During the intake stroke, the piston moves downward as the air-fuel mixture is introduced into the combustion chamber through the intake valve. During the compression stroke, the piston moves upward and compresses the air-fuel mixture. During the power stroke, the air-fuel mixture has ignited, creating the explosive force that drives the piston downward. During the exhaust stroke, the piston moves upward, pushing the exhaust fumes through the exhaust valve.

The present invention is not limited to four-stroke (or four-cycle) engines, however. The present invention could also be used with a two-stroke (or two-cycle) engine in which the end of the combustion stroke and the beginning of the compression stroke happen simultaneously and the intake and exhaust functions are performed at the same time.

The air-fuel mixture is introduced into the combustion chamber in one of two ways—by a carburetor or a fuel injection system. With a carburetor, the air-fuel mixture is drawn or sucked into the combustion chamber through the intake valve as the piston moves downward, thereby decreasing the pressure in the combustion chamber. At start-up of the engine, the ratio of air to fuel in the air-fuel mixture is controlled by a choke plate that is situated just inside of the carburetor throat. Gasoline is drawn into the air flow inside of the carburetor from a fuel bowl inside the carburetor between the carburetor throat and the throttle valve. The throttle valve controls the flow of the air-fuel mixture into an intake manifold, which in turn holds the air-fuel mixture until it is drawn into the combustion chambers by the pressure differential created by the downwardly moving pistons.

With a fuel injection system, gasoline is sprayed directly into the combustion chamber (direct fuel injection), into the intake manifold port in the intake manifold outside of the combustion chamber (ported fuel injection), or into a carburetor body (throttle body fuel injection). The present invention, which is a modified piston design, can be used with engines that have carburetors or fuel injection systems.

In a conventional reciprocating engine (i.e., one that does not utilize the present invention), not all of the air-fuel mixture that is introduced into the combustion engine is burned or combusted. This lack of combustion results in environmentally harmful emissions. The greater the percentage of air-fuel mixture that is combusted, the lower the emissions—and vice versa.

Various methods of reducing emissions have been invented over time, and a thorough review of all such inventions is beyond the scope of this application; however, four notable attempts at reducing emissions include positive crankshaft ventilation, exhaust gas recirculation, the air injection method, and the catalytic converter. With positive crankshaft ventilation and exhaust gas recirculation, polluting exhaust fumes are added to the air-fuel mixture and burned a second time. The air injection method involves pumping fresh air into the exhaust manifold to increase oxidation and destroy harmful hydrocarbons. Catalytic converters contain compounds that react with hydrocarbons in exhaust gases to convert them to less harmful compounds. The present invention is more efficient than any of these emissions reduction methods and may eliminate the need for catalytic converters altogether.

One of the problems with conventional reciprocating engines is that there is a stagnant layer of air-fuel mixture on the face (or top surface) of the piston. This layer is often referred to as the "boundary layer," and it adversely affects the distribution of fuel, flame front propagation, and exhaust gas flow out of the combustion chamber. It also adversely affects other aspects of the dynamic flow of air into, through and out of the combustion chamber. This is because the boundary layer is relatively stagnant and has a relatively higher viscosity than that of the air-fuel mixture adjacent to it in the combustion chamber. Some of the adverse effects of this boundary layer are described more fully below.

First, the boundary layer (which is a layer of air-fuel mixture) allows precipitation of fuel from the air-fuel mixture. The precipitated fuel gravitates onto the top of the piston, particularly around the edges (periphery) of the piston. This pooling of fuel prevents complete fuel combustion from occurring.

Second, the flame front is hindered by the difference in viscosity of the boundary layer relative to the rest of the gasses in the combustion chamber. The hydrocarbons in the fuel tend to create a carbon build-up that adheres to the top of the piston, further hindering proper combustion. If not sufficiently cooled, the hydrocarbon residue will pre-ignite the next air-fuel charge that enters the combustion chamber.

Third, the boundary layer continues to combust during the exhaust stroke of the engine, thereby allowing unburned or incompletely burned fuel to be purged into the exhaust stream. This can lead to combustion occurring in the exhaust system, which is undesirable.

Fourth, the boundary layer interferes with evacuation of the exhaust gasses because of its relatively higher viscosity and the fact that it resides on top of the piston. It also hinders the incoming air-fuel mixture that is drawn or blown into the combustion chamber during the intake stroke.

The present invention solves all of the problems created by the boundary layer on the face of the piston by directing (or shooting) the air-fuel mixture across the surface of the piston and toward the center of the piston, where the spark plug is located. This rapid redirection of the air-fuel mixture wipes the boundary layer off the surface of the piston (i.e., disrupts it) and/or prevents it from forming. Although other inventions have been designed to create general turbulence in the combustion chamber, none of these inventions is specifically directed toward shooting or directing the air-fuel mixture toward the center of the piston through the use of radially configured grooves whose depth and width are specifically tailored to create this shooting action.

Examples of invention designed to create turbulence within the combustion chamber include U.S. Pat. No. 4,063,537 (Lampredi, 1977) (describing a secondary chamber in a combustion chamber for a diesel engine, wherein a central channel induces turbulence in the combustion gasses, and grooves in the piston crown trap gasses escaping from the central channel); U.S. Pat. No. 5,065,715 (Evans, 1991) (providing a piston with a central bowl and a plurality of squish jet channels circumferentially spaced about the bowl, the purpose of the jet channels being to direct air-fuel mixture into the bowl and to create turbulence within the bowl); U.S. Pat. No. 6,047,592 (Wirth et al. 2000) (disclosing a modified piston with two longitudinal guiding ribs and a cross-guiding rib (to form an H-shaped configuration), one of the purposes of which is to form a tumble flow during the suction (intake) phase and transform the tumble flow into increased turbulence during the late compression phase); U.S. Pat. No. 6,170,454 (McFarland et al., 2001) (describing a piston with a raised portion increasing in height from the center of the piston toward the perimeter and with a plurality of dimples on the raised portion for creating eddies (or turbulence) within the air-fuel mixture); and U.S. Pat. No. 7,810,479 (Naquin, 2010) (in a preferred embodiment, providing a piston with three parallel grooves extending across the width of the piston face, the inventor claiming that combustion efficiency of an engine is related to the level of turbulence in the combustion chamber and that fluid flow is converted from laminar to turbulent when it exits the grooves in the piston face).

U.S. Pat. No. 4,471,734 (Showalter, 1984) discloses a modified piston top comprising long and short slots arranged in a radial configuration. The slots are designed to break up the roll-up vortex that forms on the top of the piston starting at the cylinder wall. (The vortices of the present invention start at the center of the piston.) This roll-up vortex is described as a direct consequence of the relative motion between the piston and the boundary layer near the surface of the cylinder (presumably the cylinder wall). These vortices are the exact opposite of the vortices created by the present invention in that they move radially inward (the vortices of the present invention move radially outward). According to the inventor, the hydrocarbons in these vortices do not burn; therefore, the purpose of the invention is to break up these vortices and create turbulence within the combustion chamber.

U.S. Pat. Nos. 7,581,526 (Lehmann, 2009) and 7,721,704 (Lehmann, 2010) involve a piston design with a plurality of vanes extending "axially," which the inventor has defined as in the direction of the thrust line of the piston (i.e. the vanes extend upwardly from the piston face). Each vane comprises two walls. The walls may be planar or curved, and they may intersect one another or be joined by a connecting surface (as in a plateau on the top of a mountain). In one embodiment, the vanes are arranged in a radial configuration. In all embodiments, the distance between the walls of the vane is greater proximate the piston (nearest the piston face) than at the distal end of the vane (farthest from the piston face). The vanes are part of a device that is attached to the top surface of the piston crown by welding, bolts or other connecting means; in an alternate embodiment, the piston and device are unitary in construction. According to the inventor, the vanes may differ in height on a single device. The vanes create vortices in the air-fuel mixture in the combustion chamber, and these vortices are more perpendicular than parallel to the direction of movement of the piston.

BRIEF SUMMARY OF THE INVENTION

The present invention is a modified piston for a reciprocating engine, the piston having a piston face, wherein the piston face comprises a plurality of radially-oriented grooves; wherein each groove comprises a distal end proximate a periphery of the piston face and a proximal end proximate a center of the piston face; wherein the width of the distal end of each groove is greater than the width of the proximal end of the groove; wherein the depth of the distal end of each groove is greater than the depth of the proximal end of the groove; and wherein the proximal end of each groove terminates in a point.

In a preferred embodiment, each groove comprises two flat inner walls that form a first angle at a bottom edge of the groove, the first angle being roughly ninety degrees. In another preferred embodiment, each inner wall of each groove forms a second angle relative to the piston face, and the second angle is roughly forty-five degrees.

In an alternate embodiment, each groove comprises two flat inner walls that form a first angle at a bottom edge of the groove, the first angle being in the range of thirty to one hundred fifty degrees. In another embodiment, each inner wall of each groove forms a second angle relative to the piston face, and the second angle is in the range of fifteen to seventy-five degrees.

In a preferred embodiment, a third angle exists between a horizontal axis of the piston face and the bottom edge of the groove, and the third angle is roughly two degrees. In an alternate embodiment, a third angle exists between a horizontal axis of the piston face and the bottom edge of the groove, and the third angle is in the range of one degree to six degrees.

In a preferred embodiment, each groove comprises a first flat inner wall and a second flat inner wall, an angle exists between the first inner wall and a vertical axis of the groove, an angle exists between the second inner wall and the vertical axis of the groove, and the angle between the first inner wall and the vertical axis of the groove and the angle between the second inner wall and the vertical axis of the groove are equal.

In a preferred embodiment, none of the grooves intersects with one another. The lengths of all of the grooves are preferably equal. The distal end of each groove is preferably rounded.

REFERENCE NUMBERS

1 Piston
2 Aperture (for piston pin)
3 Circumferential channel (for piston ring)
4 Piston face
4a Center (of piston face)
4b Periphery (of piston face)
5 Groove
5a Proximal end (of groove)
5b Arcuate or rounded end of groove (at distal end)
5c Inner wall (of groove)
5d Top edge (of groove)
5e Bottom edge (of groove)
6 Valve relief

DETAILED DESCRIPTION OF INVENTION

The goal of the present invention is to direct or shoot the air-fuel mixture in a controlled manner toward the center of the piston and away from the periphery of the piston, where precipitated fuel tends to pool. This action will break up an existing boundary layer and prevent a new one from forming. If the boundary layer is not allowed to form, then fuel does not precipitate out of the air-fuel mixture and pool on the piston head, forming carbon buildup. Without carbon buildup, the engine burns at a much cooler temperature, and fuel efficiency is increased.

Figure 1:
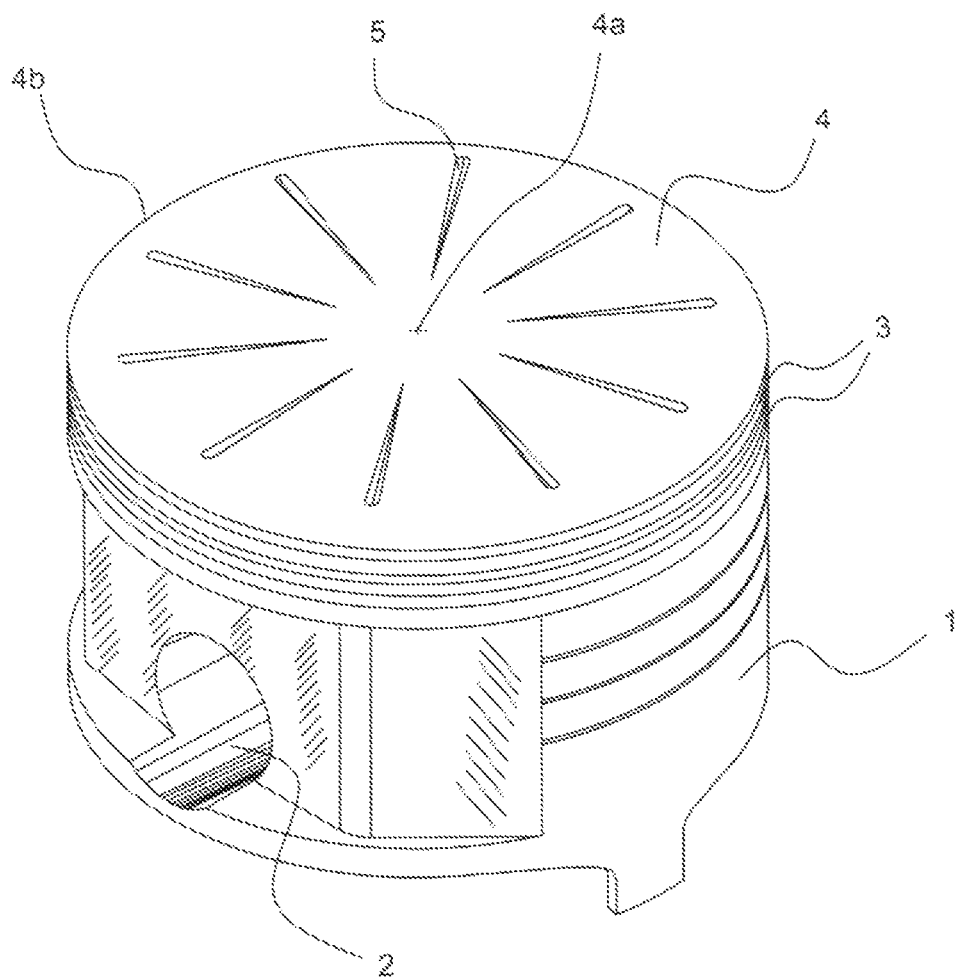
FIG. 1 is a perspective view of a piston with the radially-oriented and tapered grooves of the present invention.
Figure 1A:
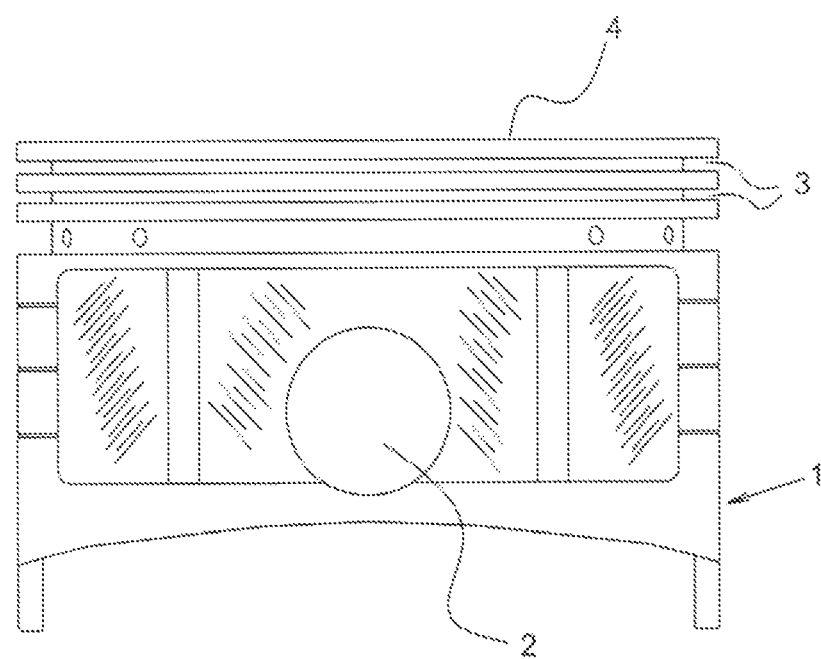
FIG. 1A is a side view of the piston shown in FIG. 1.

FIG. 1 is a perspective view of a piston with the radially-oriented and tapered grooves of the present invention. This figure shows the piston 1, the aperture (or hole) 2 for the piston pin (not shown), the circumferential channels 3 directly below the piston face 4 into which the piston rings (not shown) are inserted, and the piston face 4. (FIG. 1A shows the circumferential channels 3 more clearly.) In this figure, ten grooves 5 are shown arranged radially around the center of the piston face 4. In a preferred embodiment, the grooves 5 are straight, and they do not overlap. One end of each groove 5 terminates short of the center 4a of the piston face 4, and the other end of each groove 5 terminates short of the periphery 4b of the piston face 4. Although ten grooves 5 are shown in this figure, the present invention is not limited to any particular number of grooves 5. Note also that the lengths of the grooves are preferably equal.

Figure 2:
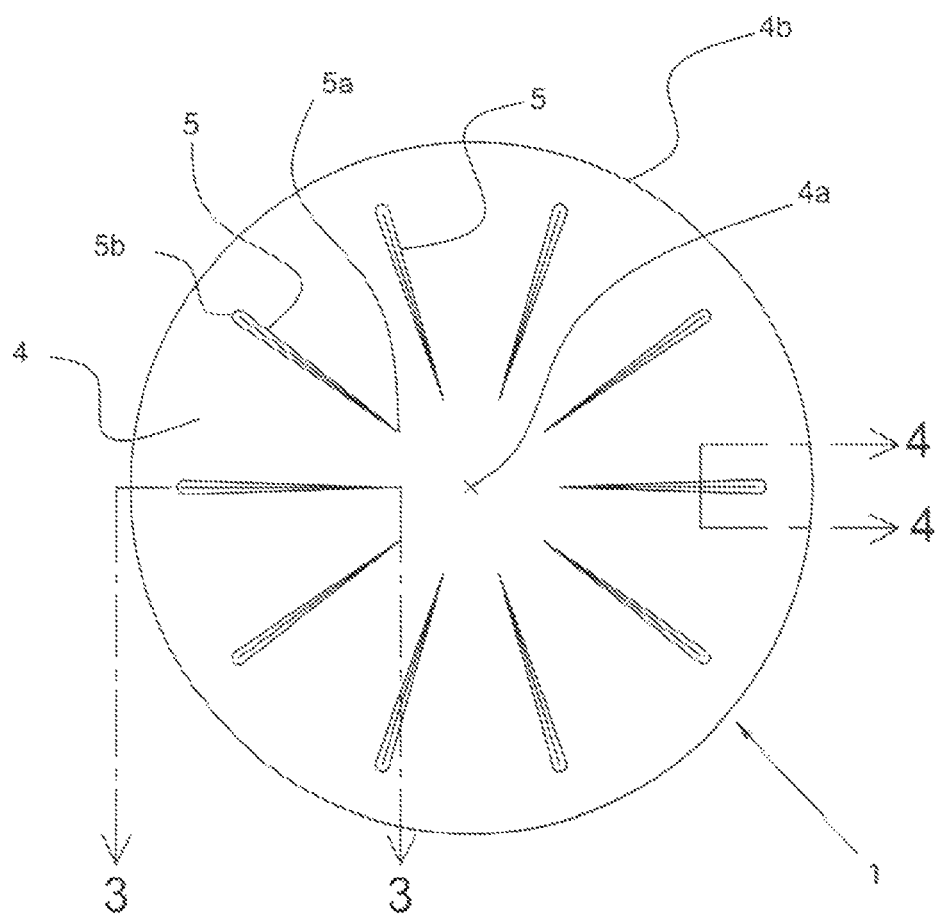
FIG. 2 is a top view of the piston shown in FIG. 1.

FIG. 2 is a top view of the piston shown in FIG. 1. As shown in this figure, the distal end of each groove 5 (i.e., the end of the groove 5 that is closest to the periphery 4b of the piston face 4) preferably terminates in a rounded or arcuate end 5b for ease of manufacture. The width of each groove 5 decreases from the distal end to the proximal end (i.e. the end of the groove 5 that is closest to the center 4a of the piston face 4) so that it is a point 5a at the proximal end.

Figure 3:
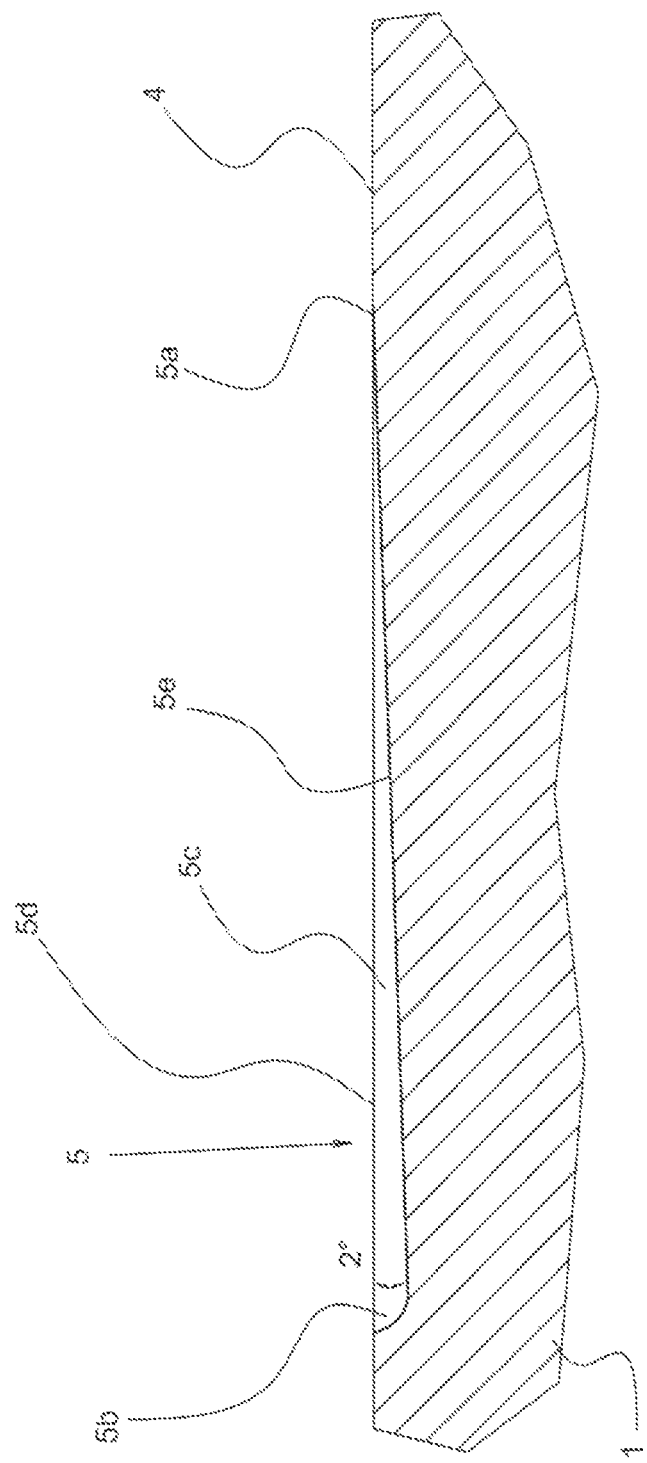
FIG. 3 is a longitudinal section view of a single radially-oriented and tapered groove.

FIG. 3 is a longitudinal section view of a single radially-oriented and tapered groove. As shown in this figure, the depth of the groove 5 gradually increases from the proximal end of the groove, where the groove is a point 5a, to the distal end of the groove, which terminates in a rounded or arcuate end 5b. In a preferred embodiment, the angle of the groove 5 (measured as the angle from the horizontal axis of the piston face 4 to the bottom edge 5e of the groove 5) is approximately two (2) degrees. In a preferred embodiment, this angle is in the range of one (1) degree to six (6) degrees. The top edges 5d of each groove 5 are preferably sharp. The fact that the depth of the groove is greatest at the periphery of the piston head is important for drawing gasses into the groove during the intake cycle, and the fact that the depth of the groove gradually diminishes from the distal to the proximal end of the groove (ultimately terminating in a point) is what causes the air-fuel mixture to move toward and then shoot out of the groove at the proximal end of the groove.

Figure 4:
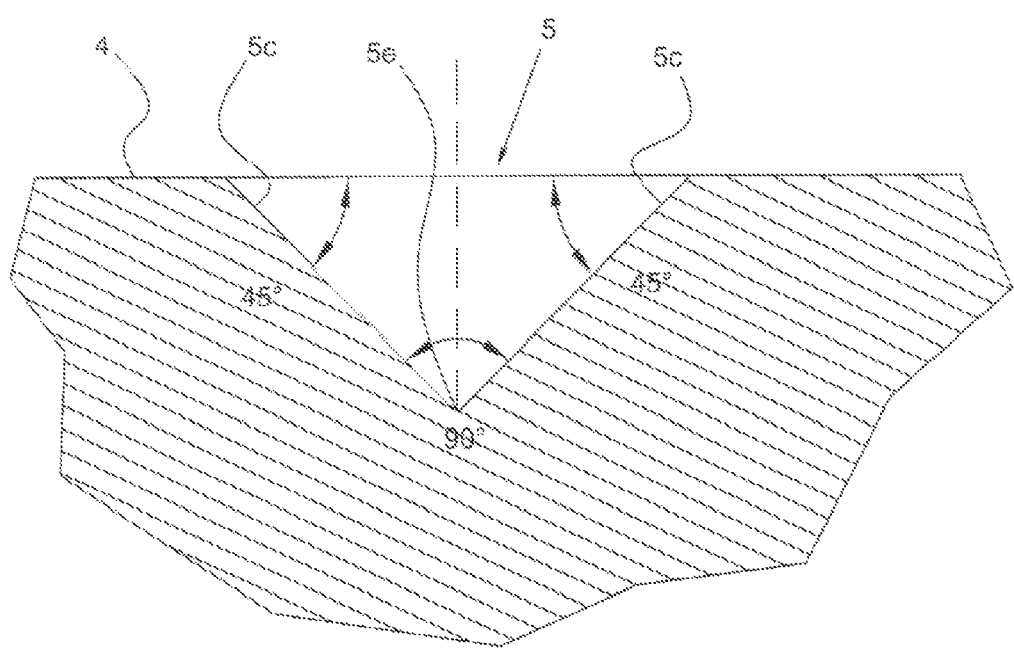
FIG. 4 is a lateral section view of a single radially-oriented and tapered groove.

FIG. 4 is a lateral section view of a single radially-oriented and tapered groove. As shown in FIG. 4, the angle between the top surface 4a of the piston 4 and the inner walls 5c of the groove 5 is roughly forty-five (45) degrees, which creates a relatively sharp angle between the piston face 4 and the inner wall 5c of the groove 5. There is also a sharp, ninety (90)-degree angle between the two inner walls 5c at the bottom edge 5e of the groove. The inventors have found that these sharp angles contribute to the effectiveness of the present invention and that grooves without these sharp angles are not as effective in accelerating the air-fuel mixture toward the center of the piston. Furthermore, the fact that the angles of the two inner walls 5c relative to the vertical axis of the groove are equal (that is, each wall is at a forty-five (45)-degree angle to the vertical axis, and the walls are at a ninety (90)-degree angle to each other) is also an important structural feature that causes the air-fuel mixture to be accelerated toward the center of the piston.

Although a preferred embodiment is shown in FIG. 4, the present invention also encompasses embodiments where the angle at the bottom of the groove (measured from the inner wall 5c to the vertical axis of the groove) varies from fifteen (15) to seventy-five (75) degrees. In other words, the angle between the two inner walls may vary from thirty (30) degrees to one hundred fifty (150) degrees. The corresponding angles between the piston face 4 and the inner walls 5c are preferably identical on both sides of the groove. By way of example, if the angle between the two inner walls 5c were thirty (30) degrees (rather than ninety (90) degrees, as shown in FIG. 4), then the angle between each inner wall and the piston face 4 would be seventy-five (75) degrees (rather than forty-five (45) degrees, as shown in FIG. 4). Similarly, if the angle between the two inner walls 5c were one hundred fifty (150) degrees, then the angle between each inner wall and the piston face 4 would be fifteen (15) degrees, and if the angle between the two inner walls 5c were sixty (60) degrees, then the angle between each inner wall and the piston face 4 would also be sixty (60) degrees.

The movement of the piston up and down within the combustion chamber induces the air-fuel mixture to flow through the grooves. When the piston moves upward (during the compression and exhaust strokes), the air-fuel mixture is directed toward the center of the piston. When the piston moves downward (during the intake stroke), the air-fuel mixture is drawn into the combustion chamber and into the grooves in the piston head (more particularly, toward the deeper outer edges of the grooves).

Figure 5:
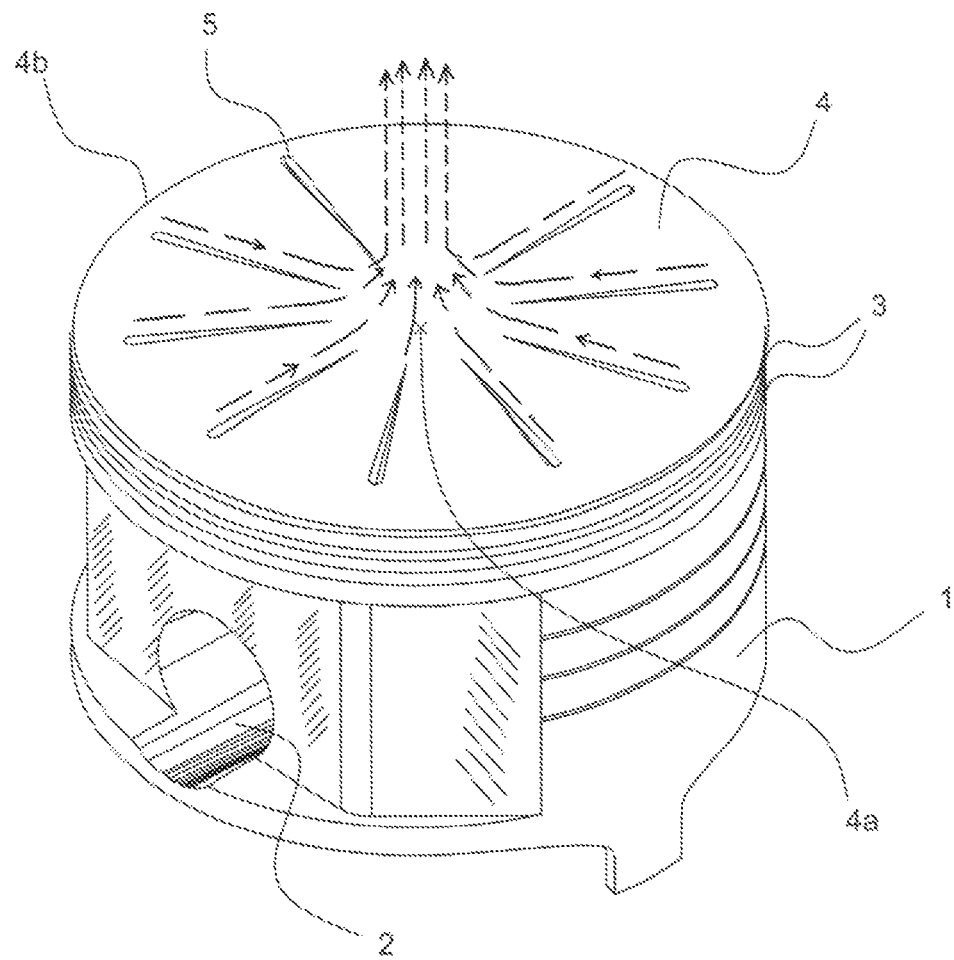
FIG. 5 is a perspective view of a piston with the radially-oriented and tapered grooves of the present invention showing the air-fuel mixture being directed toward the center of the piston by the tapered grooves.

FIG. 5 is a perspective view of a piston with the radially-oriented and tapered grooves of the present invention showing the direction in which the air-fuel mixture is forced by the piston when the air-fuel mixture in the combustion chamber is compressed. The fact that the grooves are deeper toward their outer (peripheral or distal) edges causes a greater vacuum to be created at the distal edges of the grooves than at the proximal edges when the piston moves downward within the combustion chamber, thereby pulling the air-fuel mixture toward the distal (outer) edges of the grooves. As shown in this figure, when the piston moves upward within the combustion chamber, the air-fuel mixture is directed from the distal edges of the grooves toward the tapered proximal edges of the grooves, at which point the air-fuel mixture shoots out of the grooves and is directed upward (at the center of the piston).

Because of the unique shape of the grooves 5—that is, their tapering depth and width toward the center 4a of the piston face 4, the fact that each groove 5 comprises two symmetric flat walls 5d that meet to form a ninety (90)-degree angle (i.e., two forty-five (45)-degree angles as measured from the central vertical axis of the groove 5), and the fact that the top 5d and bottom 5e edges of the grooves 5 are sharp—they are optimally configured to direct or shoot the air-fuel mixture across the face of the piston from the periphery of the piston toward its center. The air-fuel mixture is directed upward (in the same direction as the axis of movement of the piston) once it hits the end of the groove.

Figure 6:
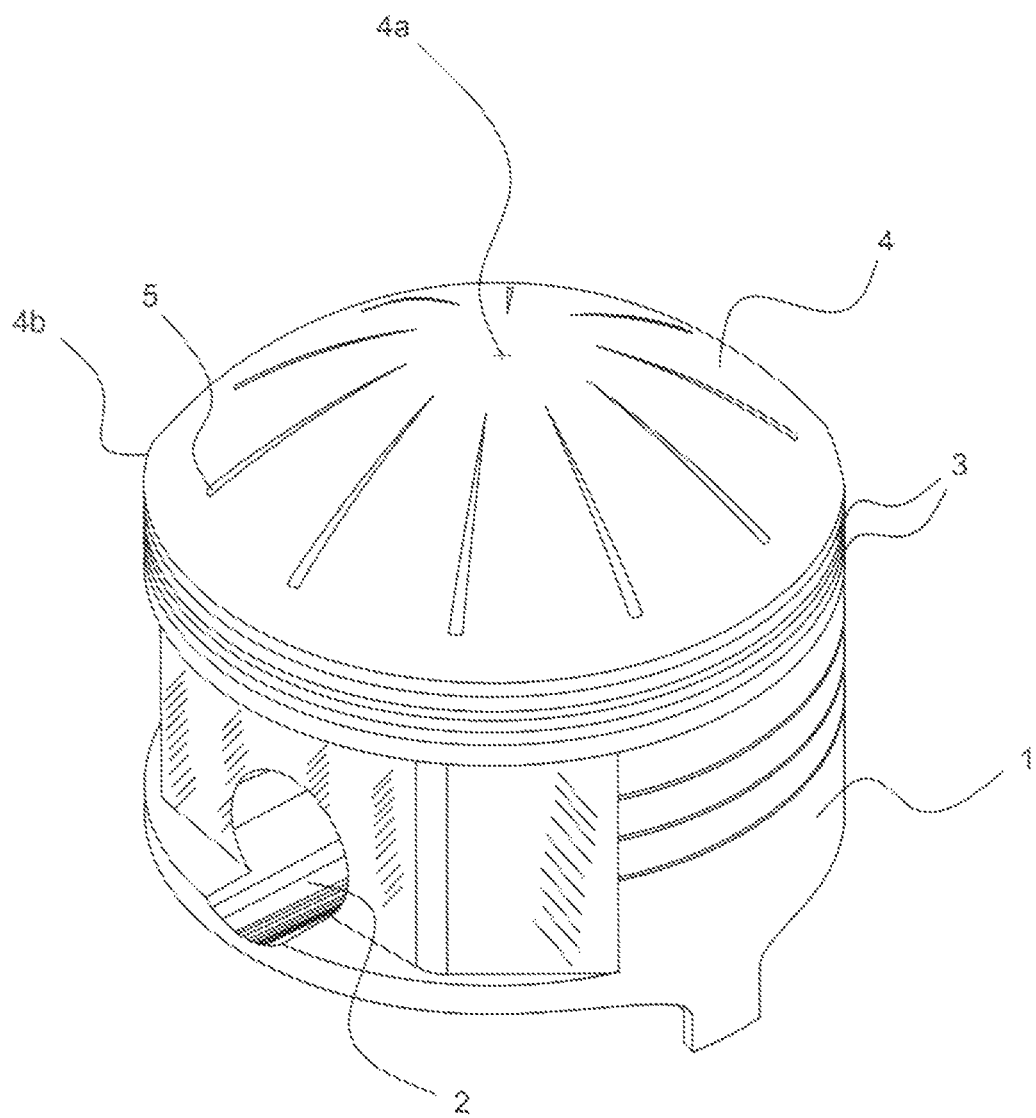
FIG. 6 is a perspective view of a piston with the radially-oriented and tapered grooves of the present invention shown on a convex piston face.
Figure 7:
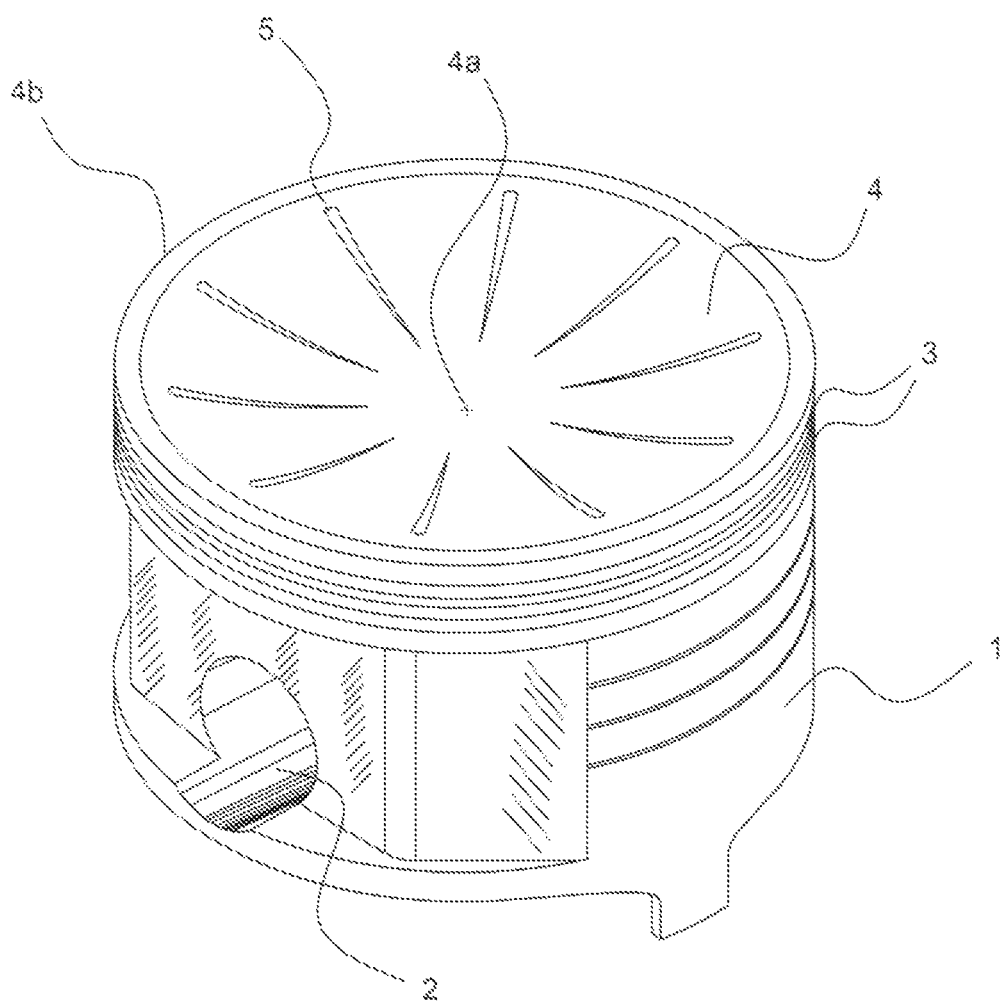
FIG. 7 is a perspective view of a piston with the radially-oriented and tapered grooves of the present invention shown on a concave piston face.
Figure 8:
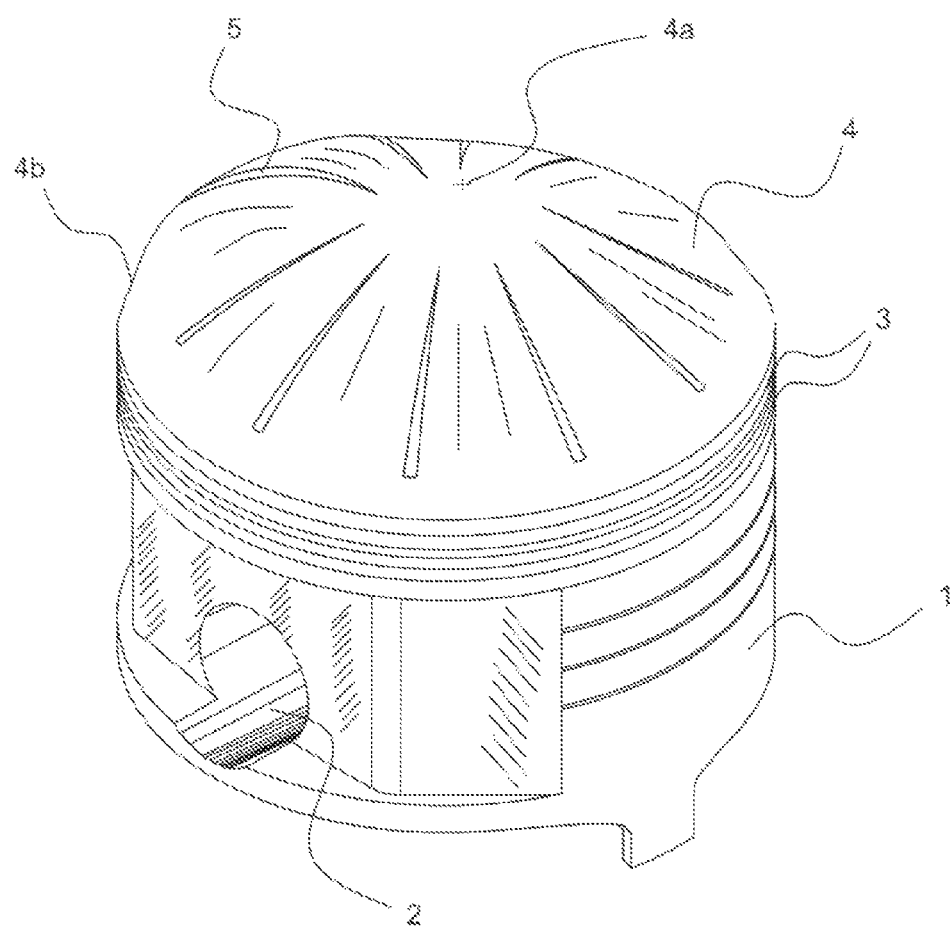
FIG. 8 is a perspective view of a piston with the radially-oriented and tapered grooves of the present invention shown on an asymmetric piston face.

FIGS. 6-10 are intended to show that the grooves of the present invention can be used with any type of piston face and not only a flat piston face. FIG. 6 is a perspective view of a piston with the radially-oriented and tapered grooves of the present invention shown on a convex piston face, and FIG. 7 is a perspective view of a piston with the radially-oriented and tapered grooves of the present invention shown on a concave piston face. FIG. 8 is a perspective view of a piston with the radially-oriented and tapered grooves of the present invention shown on an asymmetric piston face. It should be noted that despite the different shapes of piston faces, the configuration of the grooves 5 from the perspective of a top view (see FIG. 2) is the same.

Note that when the piston face 4 is anything other than flat, the angle between the inner wall 5c of the groove 5 and the piston face 4 may not necessarily be the same on either side of the groove 5; however, the angle between each inner wall 5c and the vertical axis of the groove (shown as forth-five (45) degrees in FIG. 4) will always be equal in the preferred embodiment.

Figure 9:
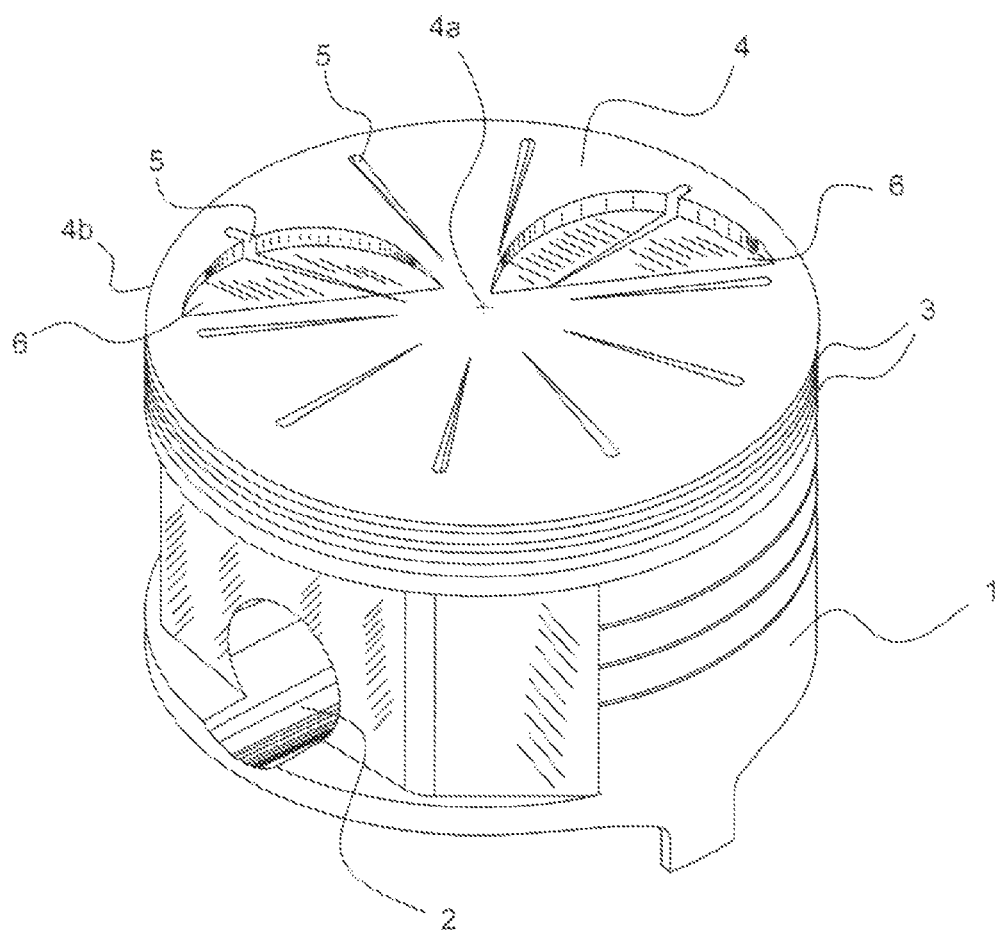
FIG. 9 is perspective view of a piston with the radially-oriented and tapered grooves of the present invention shown with two valve reliefs on the piston face and with the grooves extending through the valve reliefs.
Figure 10:
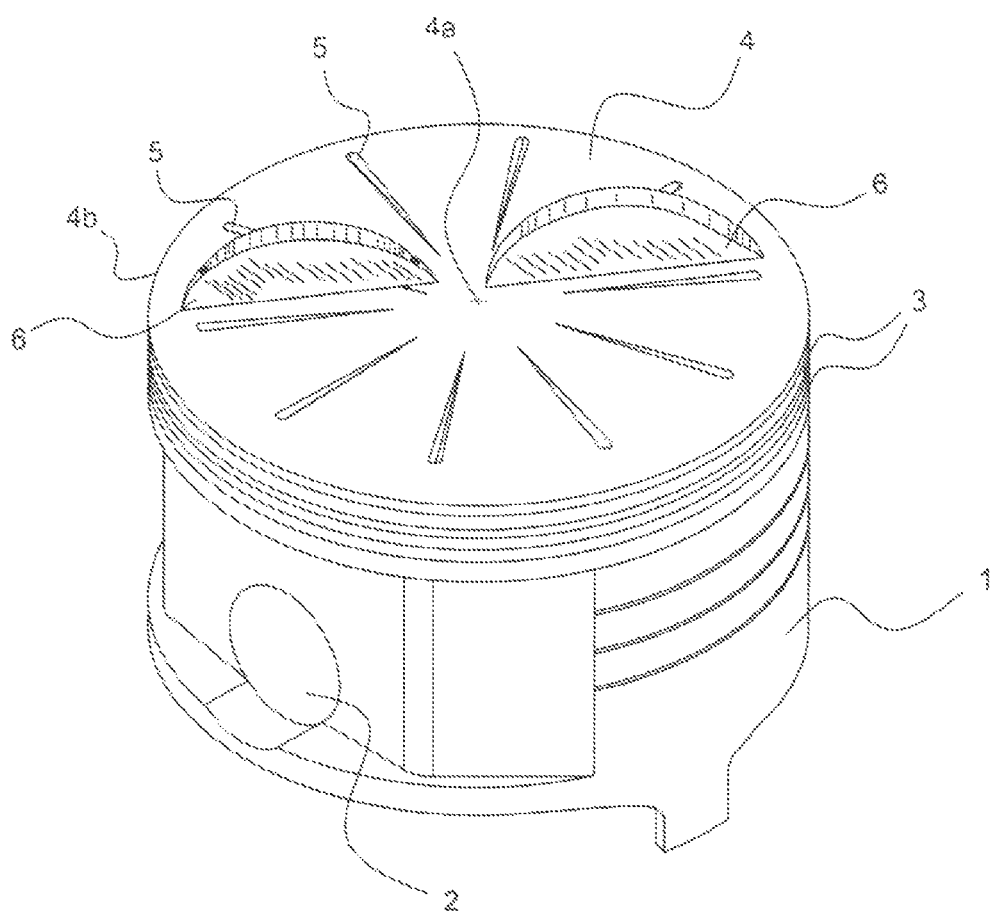
FIG. 10 is a perspective view of a piston with the radially-oriented and tapered grooves of the present invention shown with two valve reliefs on the piston face and with the grooves not extending through the valve reliefs.

FIG. 9 is a perspective view of a piston with the radially-oriented and tapered grooves of the present invention shown with a valve relief on a flat piston face and with the grooves extending through the valve relief. This figure is intended to show that the grooves may extend through the valve reliefs 6. FIG. 10 is a perspective view of a piston with the radially-oriented and tapered grooves of the present invention shown with a valve relief on a flat piston face and with the grooves not extending through the valve relief. This figure shows an alternate embodiment in which the grooves do not extend through the valve reliefs 6. The top view of the embodiment shown in FIG. 9 would be the same as that shown in FIG. 2, but the top view of the embodiment shown in FIG. 10 would omit the grooves 5 where the valve reliefs 6 are located.

By dispersing and/or eliminating formation of the boundary layer on top of the piston face, the present invention prevents the piston face from overheating due to carbon buildup, and it allows a greater percentage of fuel in the air-fuel mixture to be burned. Thus, the present invention results in a cooler engine, cleaner emissions, and more torque and power per gallon of fuel. It also extends the life of the piston because it avoids carbon buildup and overheating.

Although the preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

I claim:

1. A modified piston for a reciprocating engine, the piston having a piston face:
    wherein the piston face comprises a plurality of radially-oriented grooves;
    wherein each groove comprises a distal end that is proximate to but terminate short of a periphery of the piston face and a proximal end that is proximate to but terminate short of a center of the piston face;
    wherein a width of the distal end of each groove is greater than a width of the proximal end of the groove;
    wherein a depth of the distal end of each groove is greater than a depth of the proximal end of the groove; and
    wherein the proximal end of each groove terminates in a point; and
    wherein each groove comprises two flat inner walls that come together to form a sharp angle at a bottom edge of the groove, the bottom edge extending from the distal end of the groove to the proximal end of the groove and being centered along a bottom of the groove, the bottom edge defining a first angle between the two flat inner walls, the first angle extending from the distal end of the groove to the proximal end of the groove.

2. The modified piston of claim 1, wherein the first angle is roughly ninety degrees.

3. The modified piston of claim 2, wherein each inner wall of each groove forms a second angle relative to the piston face, and wherein the second angle is roughly forty-five degrees.

4. The modified piston of claim 1, wherein the first angle is in the range of thirty to one hundred fifty degrees.

5. The modified piston of claim 4, wherein each inner wall of each groove forms a second angle relative to the piston face, and wherein the second angle is in the range of fifteen to seventy-five degrees.

6. The modified piston of claim 3 or 5, wherein a third angle exists between a horizontal axis of the piston face and the bottom edge of the groove, and wherein the third angle is roughly two degrees.

7. The modified piston of claim 3 or 5, wherein a third angle exists between a horizontal axis of the piston face and the bottom edge of the groove, and wherein the third angle is in the range of one degree to six degrees.

8. The modified piston of claim 1, wherein the two flat inner walls of each groove comprise a first flat inner wall and a second flat inner wall, wherein an angle exists between the first inner wall and a vertical axis of the groove, wherein an angle exists between the second inner wall and the vertical axis of the groove, and wherein the angle between the first inner wall and the vertical axis of the groove and the angle between the second inner wall and the vertical axis of the groove are equal.

9. The modified piston of claim 1, wherein none of the grooves intersects with one another.

10. The modified piston of claim 1, wherein each groove has a length, and the lengths of all of the grooves are equal.

11. The modified piston of claim 1, wherein the distal end of each groove is rounded and closed to the periphery of the piston face.

\* \* \* \* \*